United States Patent Office 3,148,224
Patented Sept. 8, 1964

3,148,224
POLYMERIZATION OF CONJUGATED DIOLEFINS USING NICKEL COMPLEXES AND METAL HYDRIDES AS CATALYST
Lionel B. Luttinger, Stamford, Conn., assignor to American Cyanamid Company, New York, N.Y., a corporation of Maine
No Drawing. Filed July 24, 1961, Ser. No. 125,976
4 Claims. (Cl. 260—666)

This invention relates to a process for polymerizing butadiene to produce low molecular weight oligomers of said butadiene comprising heating butadiene in the presence of a catalyst composition comprising (1) a transition metal complex having the formula $$[M(R_3P)_2]_mX_n$$

wherein M is a metal selected from the group consisting of nickel, cobalt, iron, palladium, and platinum, R is a member selected from the group consisting of alkyl, aryl and cyanoalkyl radicals, X is an anion, m is an integer of from 1 to 3 inclusive and n is an integer from 1 to 4 inclusive and (2) a metallic compound having at least one metal to hydridic hydrogen bond. More particularly, this invention relates to a process for preparing cyclic homo-oligomers of butadiene using the above stated catalytic composition. Still further this invention relates to a process for producing cyclic dimers, trimers and/or tetramers of butadiene.

One of the objects of the present invention is to produce a low molecular weight oligomer of butadiene. A further object of the present invention is to produce cyclic polymers of butadiene including cyclic dimers, trimers and/or tetramers. These and other objects of the present invention will be discussed in greater detail hereinbelow.

The process of the present invention is directed to the polymerization of monomeric butadiene although other dienes may be polymerized by the same procedure to produce homo-oligomers or co-oligomers. Illustrative of the other dienes which may be used in the process of the present invention are chloroprene, isoprene, and the like. The catalyst composition used in the present invention is comprised of a mixture of (1) a transition metal complex having the general formula $$[M(R_3P)_2]_mX_n$$

wherein M is a metal selected from the group consisting of nickel, cobalt, iron, palladium and platinum, R is a radical selected from the group consisting of alkyl, aryl and cyanoalkyl radicals, X is an anion, m is an integer of from 1 to 3 inclusive and n is an integer from 1 to 4 inclusive and (2) a metallic compound having at least one metal to hydridic hydrogen bond. Specifically illustrative of the transition metal complex material are Ni[(CH$_3$)$_3$P]$_2$Cl$_2$
Ni[(C$_2$H$_5$)$_3$P]$_2$Cl$_2$
Ni[(C$_3$H$_7$)$_3$P]$_2$Cl$_2$
Ni[(C$_4$H$_9$)$_3$P]$_2$Cl$_2$
Ni($\phi_3$P)$_2$Cl$_2$
Ni[(CH$_2$CH$_2$CN)$_3$P]$_2$Cl$_2$ In the place of nickel one may use as the metallic component cobalt, iron, palladium and platinum. In the place of the alkyl groups such as methyl, ethyl, propyl and butyl shown hereinabove, one may use such branch chain alkyls as isopropyl, isobutyl, tertiarybutyl and higher alkyl groups such as amyl, hexyl, heptyl, octyl and the like. In the place of the phenyl grouping one may use substituted phenyls such as tolyl and the like.

As anions in the place of the chloride one may use other halides such as bromide, iodide and the like or nitrates, thiocyanates, phosphates, sulphates, acetates and the like.

The compounds which are used in conjunction with the transition metal complex include all metallic compounds containing a hydridic hydrogen associated with a metal. The term hydridic is used in the customary sense [see J. H. Smalley and S. F. Stafiej, J. Am. Chem. Soc., 81, 582 (1959)] as meaning a hydrogen atom attached to some other atom by a bond (covalent or ionic) which is polarized so that the hydrogen atom is negatively charged (hydridic) as opposed to positively charged (acidic). [See D. T. Hurd, An Introduction to the Chemistry of the Hydrides (John Wiley & Sons, Inc., New York, 1952) pp. 24–26, 56–59.]

Compounds which are within the above definition may preferably be selected from one of the following categories:

(1) Simple known hydrides of Groups I to III of the Periodic System, such as LiH, B$_2$H$_6$ etc.

(2) Complex hydrides of Group III, such as NaBH$_4$, LiAlH$_4$ etc.

(3) Hydrides from categories (1) and (2) in which one or more, but not all of the hydridic hydrogens have been replaced by other groups; examples of these hydrides are AlH(CH$_3$)$_2$, K$_2$B$_2$H$_4$(OH)$_2$ etc.

In addition to the above there are certain other less favorable compounds with hydridic hydrogens, such as SiH$_4$. The invention includes these compounds also.

The hydrides of the Group III elements such as sodium borohydride, lithium aluminum hydride and diborane have been found to be more effective than the simple hydrides of other metals. When these are used with the transition metal complexes, butadiene can be polymerized with higher yields than when the other hydrides are used. The borohydrides in particular are advantageously employed since they are operative in a large variety of solvents and are easily obtained commercially.

Many of the metal hydrides are obtained commercially or are easily prepared. For example the alkali and alkaline earth metals react with hydrogen in an atmosphere of that gas. Reference is made to Gaylord, "Reduction With Complex Metal Hydrides," Interscience Publishers, New York, 1956.

The alkali-metal borohydrides, especially LiBH$_4$, KBH$_4$ and NaBH$_4$, are well-known compounds. They may be obtained commercially or prepared according to the equation, $$4MH+BF_3Et_2O \rightarrow MBH_4+3MF+Et_2O$$

or by the method disclosed in U.S. Patent No. 2,880,058 to Bronaugh according to the equation, $$(CH_3)_3N:BCl_3+4MH \rightarrow (CH_3)_3N+MBH_4+3MCl$$

The alkali metal aluminum hydrides and borohydrides are well known and are easily obtained commercially.

In the practice of the process of the present invention, one may use temperatures varying between about 100° C. and 175° C. and preferably between about 120° C. and 160° C. The time of reaction will depend in considerable measure upon the temperature utilized, the pressure on the system and the yield desired. Temperatures significantly above 175° C. should be avoided inasmuch as such temperatures will tend to produce high molecular weight polymers of butadiene which are not as desirable for certain purposes as the low molecular weight dimers, trimers and tetramers.

The process of the present invention is carried out under superatmospheric conditions such as at about 1.5 atmospheres to about 400 atmospheres and preferably from about 10 to about 100 atmospheres. The superatmospheric conditions of the reaction are not externally applied as a preferred embodiment of the present invention but rather develop as a result of heating the butadiene in a closed system such as an autoclave.

In the practice of the process of the present invention one need not use a solvent although if desired, solvents may be used. The amount and type of solvent selected will depend in significant measure on the ultimate use of the product produced as well as on the specific catalyst combination used. If a solvent is utilized in the process of the present invention one should select an inert organic solvent, i.e., a solvent which is inert to the butadiene being polymerized and to the polymer produced. Illustrative of such solvents are benzene, toluene, xylene, acetonitrile, ethanol, hexane, heptane, octane and the like. When prepared without a solvent the low molecular weight oligomers of the present invention may be used as synthetic drying oils whereas when a coating composition is desired the use of conventional solvents such as those set forth hereinabove may be utilized. For additional uses see U.S. 2,979,543–4.

The amount of the metal complex used in the catalytic composition of the present invention may be varied over a fairly wide range such as between about 0.001 mol to about 0.10 mol per mol of butadiene. The amount of the metallic compound having at least one metal to hydridic hydrogen bond used in the present invention may likewise be varied over a fairly wide range such as between about 0.005 and 0.20 mol per mol of butadiene. It can be seen from this that one may use between 5 mols of the metal complex per mol of the metallic compound having at least one metal to hydridic hydrogen bond to about one mol of the metal complex per 20 mols of the metallic compound having at least 1 metal to hydridic hydrogen bond.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

A suitable reaction vessel in the nature of a higher pressure stainless steel autoclave is chilled to about −78° C. with Dry Ice and acetone and then there is introduced 2 parts of sodium borohydride admixed with 1 part of $Ni(Bu_3P)_2Cl_2$ and 100 parts of ethanol. The autoclave is then sealed and flushed twice with prepurified nitrogen. 50 parts of butadiene, which has been distilled over dry powdered calcium carbide is added by means of a transfer bomb. The autoclave is then heated, with rocking, at 140° C. for 24 hours. The autoclave is then cooled to room temperature, vented to release the gases present and opened. The contents are washed out with petroleum ether and the solid unreacted catalyst is filtered off. The product remaining after the petroleum ether evaporation is a yellow oil. The products are analyzed by infrared spectroscopy, mass spectroscopy, chromotagraph and nuclear magnetic resonance. The yield was 36% of oligomers.

Examples 2–13 are repetitions of Example 1 and are set forth in the table hereinbelow with the variations in each instance from those of Example 1.

*Table I*

| | Moles $C_4H_6$ | Moles $NaBH_4$ | Transition Metal Compound (mols) | Solvents | Reaction Time and Temp. (hrs./° C.) | Product Yield, percent |
|---|---|---|---|---|---|---|
| 2 | 1.50 | 0.026 | $(Bu_3P)_2NiCl_2$, 0.011 | None | 24/150 | 61 |
| 3 | 1.22 | 0.10 | $(Bu_3P)_2NiCl_2$, 0.011 | None | 24/108 | 45 |
| 4 | 1.11 | 0.10 | $(Bu_3P)_2NiCl_2$, 0.011 | 100 cc. E | 72/114 | 20 |
| 5 | 1.22 | 0.10 | $(Bu_3P)_2NiCl_2$, 0.0075 | 100 cc. E | 24/130 | 25 |
| 6 | 1.33 | 0.10 | $(\phi_3P)_2NiCl_2$, 0.0061 | 100 cc. P | 24/114 | 16 |
| 7 | 1.0 | 0.053 | $[P(CH_2CH_2CN)_3]_2NiCl_2$, 0.0012 | 120 cc. E | 24/150 | 52 |
| 8 | 1.1 | 0.1 | $[P(CH_2CH_2CN)_3]_2NiBr_2$, 0.001 | 90 cc. E | 24/135 | 44 |
| 9 | 0.92 | 0.079 | $(Bu_3P)_2NiCl_2$, 0.0038 | None | 24/130 | 42 |
| 10 | 0.92 | 0.079 | $(Bu_3P)_2NiCl_2$, 0.0038 | 100 cc. A | 24/120 | 20 |
| 11 | 0.30 | 0.05 | $(\phi_3P)_2Ni(CNS)_2$, 0.002 | 75 cc. E | 24/175 | 58 |
| 12 | 1.51 | 0.132 | $NiCl_2[PBu_3]_2$, 0.005 | None | 36/118+36/150 | 36 |
| 13 | 1.18 | 0.132 | $NiCl_2[PBu_3]_2$, 0.005 | None | 24/118 | 23 |

Solvents: A=Acetonitrile; E=Absolute ethanol; P=Petroleum ether.
Bu=butyl; $\phi$=phenyl.

In the practice of the process of the present invention, improved qualitative yields are realized by making use of calcium carbide in amounts varying between about 0.05 mol to about 0.1 mol per mol of butadiene. In Example 4, for instance, 0.1 mol of calcium carbide is used. In each of Examples 12 and 13, 0.078 mol of calcium carbide is used.

In order to avoid the production of significant amounts of high polymer of butadiene one may utilize a polymerization inhibitor such as a quinone. One may utilize benzoquinone, diisopropylquinone, tertiary butyl quinone, 2,5-bis(tertiary butyl) benzoquinone-1,4 and the like. The amount of the inhibiting material utilized may be varied between about 0.001 mol and 0.05 mol of inhibitor per mol of butadiene.

This application is a continuation-in-part application of my earlier filed application, Serial No. 844,632, filed October 6, 1959, entitled "New Catalyst System for Linear and Cyclic Polymerization of Mono-Substituted Acetylenes."

I claim:

1. A process for producing low molecular weight oligomers of butadiene comprising heating said butadiene at a temperature between about 100° C., and 175° C. in the presence of a catalyst composition comprising a mixture of (1) a transition metal complex having the formula:

$$[M(R_3P)_2]_mX_n$$

wherein M is a metal selected from the group consisting of nickel, cobalt, iron, R is a member selected from the group consisting of alkyl, aryl and cyanoalkyl radicals, X is anion selected from the group consisting of halides, nitrates, thiocyanates, phosphates, sulfates and acetates, $m$ is an integer of from 1 to 3 inclusive and $n$ is an integer from 1 to 4 inclusive and (2) a metallic compound having at least one metal to hydridic hydrogen bond.

2. The process of claim 1 wherein the transistion metal complex is $Ni(\phi_3P)_2Cl_2$.

3. The process of claim 1 wherein the transition metal complex is $Ni(Bu_3P)_2Cl_2$.

4. The process according to claim 1 wherein the transition metal complex is $Ni[(CH_2CH_2CN)_3P]_2Cl_2$.

References Cited in the file of this patent

UNITED STATES PATENTS 2,264,811    Rothrock _____ Dec. 2, 1941

FOREIGN PATENTS 831,350    Great Britain _____ Mar. 30, 1960
879,269    Great Britain _____ Oct. 11, 1961
1,109,674    Germany _____ July 29, 1961